2 Sheets--Sheet 1.

T. INSULL.
Joint-Plates for Molders' Flasks.

No. 147,641. Patented Feb. 17, 1874.

WITNESSES: INVENTOR:
Jno. L. Coure Thomas Insull
Walter Allen By Knight Bros. Attorneys.

2 Sheets--Sheet 2.

T. INSULL.
Joint-Plates for Molders' Flasks.

No. 147,641. Patented Feb. 17, 1874.

WITNESSES.
Jno. L. Ewin
Walter Allen

INVENTOR.
Thomas Insull
By Knight Bros Attorneys.

AM. PHOTO-LITHOGRAPHIC CO. N.Y. (OSBORNE'S PROCESS.)

UNITED STATES PATENT OFFICE.

THOMAS INSULL, OF PHILADELPHIA, PENNSYLVANIA, ASSIGNOR TO THOMAS INSULL, JAMES F. DOVEY, AND JOHN J. DOVEY, OF SAME PLACE.

IMPROVEMENT IN JOINT-PLATES FOR MOLDERS' FLASKS.

Specification forming part of Letters Patent No. 147,641, dated February 17, 1874; application filed October 31, 1873.

*To all whom it may concern:*

Be it known that I, THOMAS INSULL, of the city and county of Philadelphia, in the State of Pennsylvania, have invented a certain Improvement in Molders' Flasks and Joint-Plates therefor, of which the following is a specification:

This invention consists in providing a molder's flask with a joint-plate having a plurality or series of seats or openings for the patterns, and made reversible, so that the two parts of the mold may be formed upon its opposite faces, whereby the patterns will be located in accurately corresponding positions in the two parts of the mold, as hereinafter explained.

Figure 1:
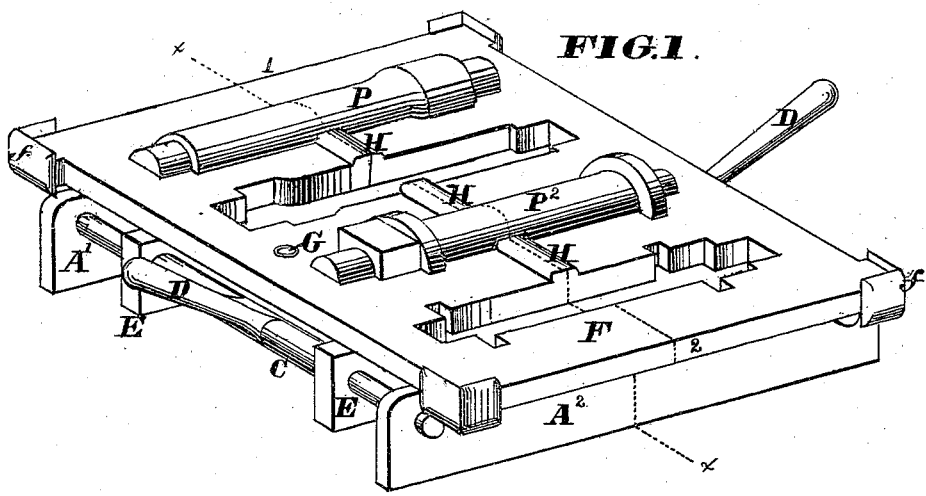
Figure 2:
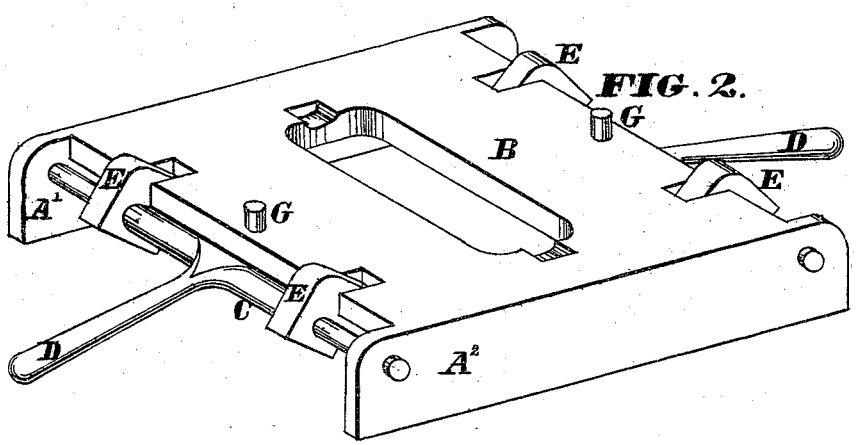
Figure 3:
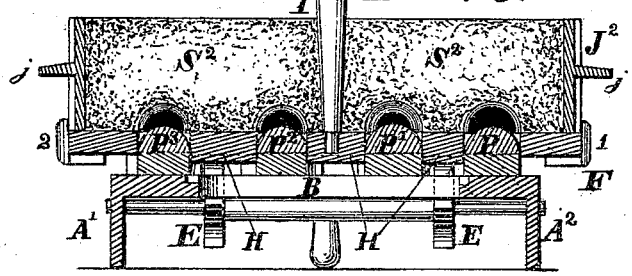
Figure 4:
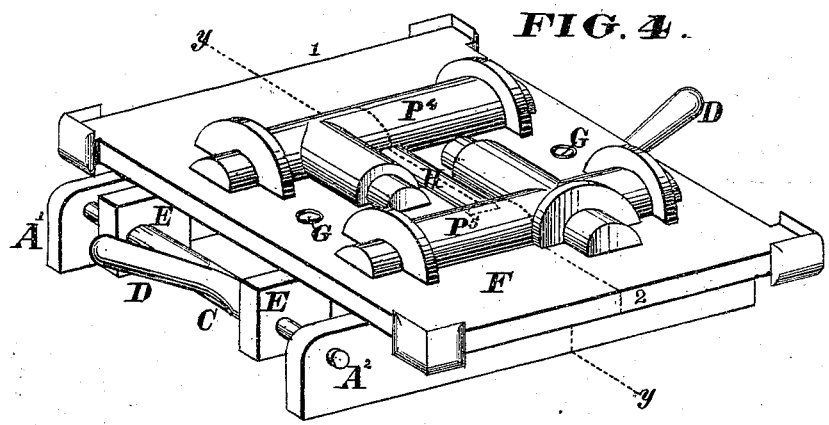
Figure 5:
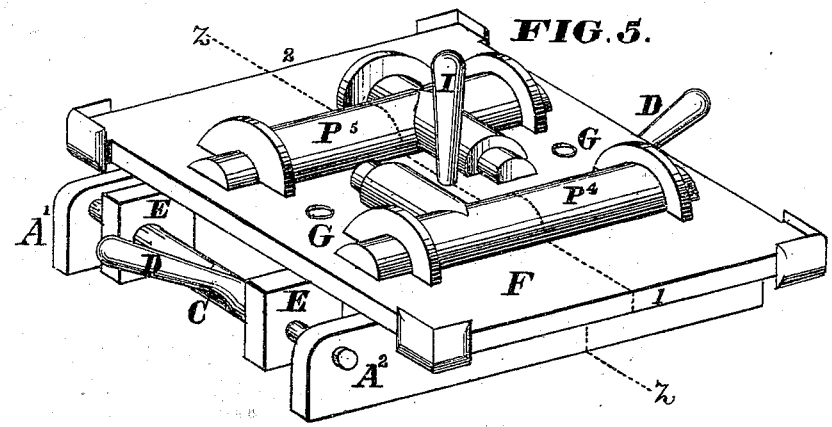
Figure 6:
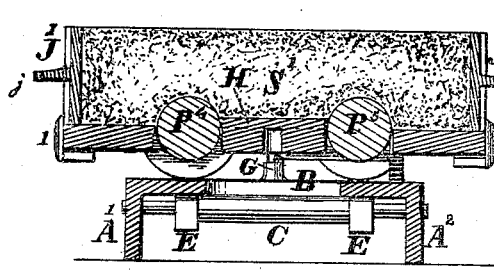
Figure 7:
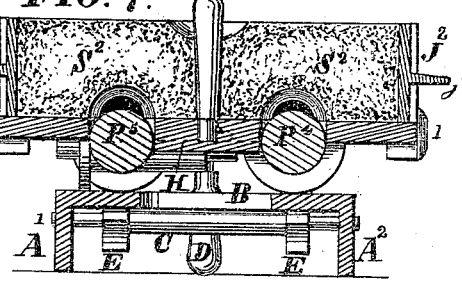

In the accompanying drawings, Figure 1 is a perspective view of the base of the apparatus and the joint-plate with two patterns in position. Fig. 2 is a perspective view of the base with the joint-plate removed. Fig. 3 is a vertical section on the line $x$ $x$, Fig. 1, but showing the joint-plate inverted and elevated, and the flask and formed mold in position upon it. Figs. 4 and 5 are perspective views of the base and joint-plate, illustrating the application of the invention to the formation of the two parts of a mold for casting irregular forms. Figs. 6 and 7 are sections on the lines $y$ $y$ and $zz$, Figs. 4 and 5, with the respective parts of the flask in position.

The base of the mold consists of a bed-plate, B, supported at a suitable height by bars $A^1$ $A^2$, to afford room for the motion of rock-shafts C C, journaled in the supporting-bars $A^1$ $A^2$, the said rock-shafts being operated by levers D D, and carrying cams E E, on which the movable joint-plate F rests, so that it may be thrown up when required, and again allowed to descend. Studs G G, occupying holes in the joint-plate, insure the correct seating thereof, and guide it in its vertical movement. The joint-plate has openings to fit the desired patterns, some of which are shown at P $P^1$ $P^2$ $P^3$ in Figs. 1 and 3, and at $P^4$ $P^5$ in Figs. 4 and 5.

For molding regular forms—as, for example, carriage axle-boxes, such as illustrated in Figs. 1 and 3—half-patterns are employed, the same surface being used to produce each half of the matrix in succession, as hereinafter explained. For irregular forms, as shown in Figs. 4, 5, 6, and 7, entire patterns are used, and they are inverted, as well as the joint-plate.

On one side the plate F has ridges H, to form sprues in the mold, and on the other a hole, to support the gate-plug I. $J^1$ and $J^2$ represent, respectively, the nowel and cope of a flask of common form, with lifting-handles $j$. Corner flanges $f$ determine the position of the flask on the joint-plate.

The operation is as follows: For forming the lower part of the mold, the joint-plate F is placed bottom up, as shown in Fig. 1, and the patterns P, $P^1$, &c., placed in position within their seats, the greatest diameter of the pattern being on a level with the upper surface of the joint-plate. The nowel is then placed upon the joint-plate and patterns, and the sand $S^1$ rammed in the usual manner. The ends of the levers D are then pressed down, throwing up the cams E, and thereby elevating the joint-plate, and carrying the mold up clear of the patterns. The nowel, with the matrix thus formed, is then lifted off the joint-plate, inverted, and set aside for use. The joint-plate F is then inverted, either endwise or sidewise, bringing all its pattern-seats and all their parts into relative positions, corresponding with those in the half-mold already formed, and the patterns are replaced, respectively, each in the same seat or aperture in the joint-plate that it occupied before the half-patterns used for regular forms, as illustrated in Figs. 1 and 3, being, of course, placed the same way up as before. Patterns for irregular forms, such as illustrated in Figs. 4, 5, 6, and 7, are necessarily inverted in the same way as the joint-plate, and are set up as far as the thickness of the said plate, so as to bring the same point in the pattern even with the top surface; or half-patterns may be used, in the manner illustrated in Figs. 1 and 3; but with irregular forms separate half-patterns are required, each corresponding in form to the half-matrix desired, and both adapted accurately, at their joint-section, to the common pattern-seat, to which they are successively applied.

For clearness of illustration, I have marked the respective edges of the joint-plate 1 and 2, to indicate the reversed position of said plate at the two stages of the operation.

The base of the apparatus is, in each case, adapted to support the patterns at the proper height, and may be arranged to permit them to project down below the joint-plate to any necessary depth. The cope is then set on, and the gate-plug I placed in position, and the sand $S^2$ rammed, so as to form the upper half of the mold. The joint-plate is then elevated, as before, by operating the levers B, and the part mold thus formed lifted off and placed on the first.

I thus employ the same pattern-seat to form both parts of each matrix, and, by accurately locating the patterns in corresponding relative positions for each half by means of the reversible joint-plate, I insure perfect correspondence between the parts of the matrix. At the same time, by separating the mold from the patterns, and subsequently from the joint-plate, I entirely avoid the necessity of drawing patterns from an unprotected surface of sand, after the usual manner, which, as is well known, can only be done by a skillful hand, and usually requires more or less wetting and tapping, both of which impair the accuracy of the mold, and the former of which is still more injurious in settling and condensing the sand around the edges of the matrix, so as to prevent the formation of a tight joint, and to cause unequal chilling of the casting.

In practice, any desired number of lower parts of the mold are first made in succession, and then a corresponding number of upper parts, each being the exact counterpart of the rest.

My process of molding, being purely mechanical in all the details where a high degree of skill has heretofore been needed, can be worked by comparatively unskilled hands, and the invention effects many other useful results, which will be apparent to those familiar with the art to which it pertains.

The following is claimed as new:

The process herein described of molding two or more articles at one operation, by forming the two parts of the mold in succession upon the opposite sides of the reversible joint-plate F, said plate being constructed with suitable guides $f$, and with a plurality of pattern-openings, each of which openings is used as a guide for the pattern or patterns to form the two parts of each particular matrix.

THOMAS INSULL.

Witnesses:
THOMAS MASSEY,
JAMES F. DOVEY.